United States Patent [19]
Usui et al.

[11] 3,856,121
[45] Dec. 24, 1974

[54] SYNCHRONIZING DEVICE FOR MANUALLY OPERATED POWER TRANSMISSION MECHANISM

[75] Inventors: Keizaburo Usui; Eiichi Abe; Isao Hayama, all of Yokohama, Japan

[73] Assignee: Nissan Motor Company, Limited, Kanagawa-ku, Yokohama City, Japan

[22] Filed: June 11, 1973

[21] Appl. No.: 368,489

[30] Foreign Application Priority Data
June 13, 1972 Japan.............................. 47-58767

[52] U.S. Cl............................................. 192/53 F
[51] Int. Cl............................................. F16d 23/06
[58] Field of Search ..................... 192/53 F; 74/339

[56] References Cited
UNITED STATES PATENTS

| | | | |
|---|---|---|---|
| 3,175,412 | 3/1965 | Peras............................ | 192/53 F X |
| 3,347,347 | 10/1967 | Hetmann........................ | 192/53 F |
| 3,366,208 | 1/1968 | Kelbel........................... | 192/53 F |

*Primary Examiner*—Allan D. Hermann

[57] ABSTRACT

In order to provide an additional synchronizing power and an increased synchronizing efficiency during shifting to the first speed in a manually-operated power transmission mechanism, the synchronizing device comprises, in addition to those members which are usually in use, a baulk ring rotatable with the transmission mainshaft and a synchronizer ring rotatable with the first speed gear. The additional baulk ring and synchronizer ring are brought into friction engagement through their coned surfaces by thrust transfer means which transmits the pressure from the usual synchronizer clutch gear to the additional synchronizer ring across the first speed gear so that the frictional torque tending to produce synchronization between the first speed gear and the transmission mainshaft is achieved on both sides of the first speed gear with the resultant increase in the synchronizing power and efficiency achieved by the synchronizing device. Arrangements are further proposed to significantly lessen the manipulative effort required in moving the synchronizer clutch sleeve into coupling engagement with the synchronizer clutch gear after synchronism has been attained between the first speed gear and the transmission mainshaft.

11 Claims, 14 Drawing Figures

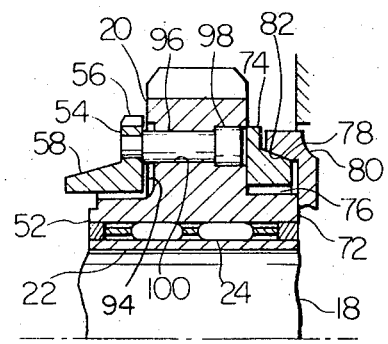

DIRECTION OF ROTATION

_SYNCHRONIZING DEVICE FOR MANUALLY OPERATED POWER TRANSMISSION MECHANISM_

The present invention relates to an automotive manually-operated multi-ratio power transmission mechanism and, more particularly, to a synchronizing device for use in the power transmission mechanism.

In a manually operated power transmission mechanism which is presently in common use, synchronism between a transmission mainshaft and a selected countergear is attained through frictional engagement between a synchronizer clutch gear rotating with a gear on the mainshaft and a synchronizer baulk ring engaging with synchronizer clutch hub. In the power transmission mechanism of this nature, an increased manipulative force is required in achieving synchronism between the mainshaft and a first speed gear because of the fact that the first speed gear has the largest gear ratio among the transmission gears. The manipulative force imposed on the operator may be reduced to a certain extent through use of a synchronizer baulk ring of a sufficiently increased diameter but, in view of the interference of a countergear assembly which is located in proximity to the synchronizing device, it is practically impossible to have the diameter of the baulk ring enlarged to a desired extent.

It is, therefore, an important object of the present invention to provide an improved synchronizing device for an automotive manually operated power transmission mechanism to achieve synchronism between the first speed gear and the transmission mainshaft with an increased efficiency and in a shortened period of time.

It is another important object of the invention to provide an improved synchronizing device which is adapted to produce an increased synchronizing power during shifting to the first speed in an automotive manually-operated power transmission mechanism.

It is still another important object of the invention to provide an improved synchronizing device which is adapted to prevent improper uncoupling or failure of uncoupling of the first speed gear from the synchronizing device as would otherwise be invited by reason of a dragging torque delivery between the frictionally engaging members of the device.

It is still another important object of the present invention to provide an improved synchronizing device which may be readily incorporated into the existing manually operated power transmission mechanism at low cost.

These and other objects of the present invention will be accomplished in a synchronizing device comprising a synchronizer clutch hub rotatable with the transmission mainshaft, a synchronizer clutch sleeve rotatable with and axially slidable on the synchronizer clutch hub, the clutch sleeve having internal gear teeth and adapted to be axially moved by a shifter fork, at least one locking member rotatable with and axially slidable on an inner peripheral wall of the synchronizer clutch sleeve, a synchronizer clutch gear located between the synchronizer clutch hub and the first speed gear and rotatable with and axially slidable on the first speed gear, the clutch gear having a conical portion tapered toward the synchronizer clutch hub, a first baulk ring located between the locking member and the synchronizer clutch gear and having an inner conical surface which matches the conical portion of the synchronizer clutch gear, the synchronizer clutch gear and the first baulk ring having external gear teeth which are in agreement with and located in line with the internal gear teeth of the synchronizer clutch sleeve, a synchronizer ring located opposite to the synchronizer clutch gear across the first speed gear and rotatable with and axially slidable on the first speed gear, the synchronizer ring having a conical portion which is tapered away from the first speed gear, a second baulk ring rotatable with the transmission mainshaft and having an inner conical surface matching the conical portion of the synchronizer ring, thrust transfer means engageable at one end with the synchronizer clutch gear and at the other with the synchronizer ring across the first speed gear so that an axial pressure from the synchronizer clutch gear is transmitted to the synchronizer ring when the synchronizer clutch gear is forced toward the first speed gear, and resilient biasing means for urging the synchronizer clutch gear away from the first speed gear.

As will be apparently appreciated as the description proceeds, the manipulative force imposed on the operator of the power transmission mechanism incorporating the synchronizing device of the general construction above described can be significantly reduced.

When synchronism is attained between the first speed gear and the transmission mainshaft, the synchronizer clutch sleeve of the synchronizing device is moved into meshing engagement with the gear teeth of the synchronizer clutch gear so that a driving connection is established from the first speed gear to the transmission mainshaft.

Thus, the present invention has a further important object in providing an improved synchronizing device which is adapted to reduce the manipulative force required in coupling the synchronizer clutch sleeve to the synchronizer clutch gear during shifting to the first speed in the automotive manually-operated power transmission mechanism.

To achieve this particular object, the present invention proposes to provide in the synchronizing device of the character above described means permitting the second baulk ring and the transmission mainshaft to be circumferentially moved relative to each other by a distance substantially equal to one half of the pitch of the internal gear teeth of the synchronizer clutch sleeve.

The objects and the features of the synchronizing device according to the present invention will become more apparent from the following description taken in conjunction with the accompanying drawings, in which:

FIG. 3 is a longitudinal sectional view showing a modification of the synchronizing device illustrated in FIG. 2;

FIG. 4 is a scrap plan view of the teeth, in mating positions, of the synchronizer clutch sleeve and the synchronizing clutch gear forming part of the synchronizing device shown in FIG. 2 or 3;

FIG. 5 is a graph indicating manipulative forces required on the operator for achieving synchronism at different instants during shifting to the first speed in the manually-operated power transmission mechanism;

FIG. 6a is a fragmentary side end view showing essential parts forming another preferred embodiment of the synchronizing device according to the present invention;

FIG. 6b is a scrap plan view of portions of the parts illustrated in FIG. 6a;

FIG. 7a is a view similar to FIG. 6a but shows the relation between the members forming the synchronizing device of FIGS. 6a and 6b as achieved when shifting is being effected up to the first speed;

Figure 1:
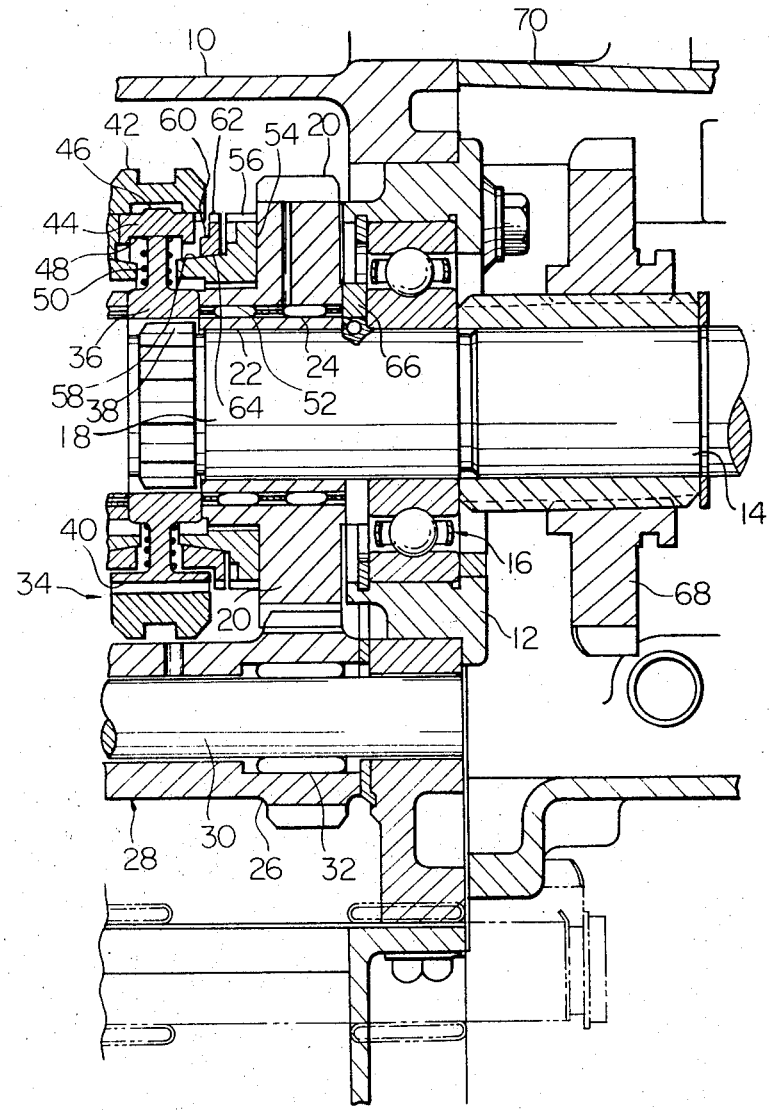
FIG. 1 is a longitudinal sectional view of a representative example of the prior art synchronizing device to be combined with the first speed gear arrangement of an automotive manually operated power transmission mechanism.

Reference will now be made to the drawings, first to FIG. 1 which illustrates a first or low speed gear arrangement of a prior art manually controlled power transmission in an automotive driveline. In FIG. 1, reference numeral 10 designates a power transmission housing which has a rear end wall 12 serving as a mainshaft bearing retainer. A transmission mainshaft 14 is journalled by a bearing 16 on this rear end wall 12 of the transmission housing 10. The mainshaft 14 has a forward extension 18 projecting into the transmission housing 10 and carries on the extension 18 a first or low speed gear 20 through a sleeve or spacer member 22 fast on the extension 18 and a needle roller bearing 24 interposed between the sleeve 22 and the inner bore of the first speed gear 20, the first speed gear 20 thus being rotatable on the extension 18 through the bearing 24.

The first speed gear 20 is in constant mesh with a first speed countergear 26 forming part of a transmission countergear assembly 28. The countergear assembly 28 is rotatable in its entirety on a countershaft 30 which is supported at its rear end on the rear end wall 12 of the transmission housing 10. Designated by reference numeral 32 is a needle roller bearing which is interposed between the countergear assembly 28 and the countershaft 30. Though not shown in FIG. 1, the countergear assembly 28 includes a counter-driven gear which is in constant mesh with a power input gear connected to a transmission input shaft which is driven from a crankshaft of the engine, as usual. A driving connection is thus constantly established from the power input gear (not shown) through the counter-driven gear (not shown) and through the first speed countergear 30 to the first gear 20 on the mainshaft extension 18.

A synchronizing mechanism, designated as a whole by reference numeral 34, includes a generally ring-shaped synchronizer clutch hub 36 which is splined as at 38 or otherwise fixed to the leading end portion of the mainshaft extension 18 and which is thus rotatable with the mainshaft 14. The synchronizer clutch hub 36 is externally splined as at 40 to a synchronizer clutch sleeve 42 which is adapted to engage a shifter fork (not shown) moved by a gearshift lever (not shown). The synchronizer clutch hub 36 is formed with a suitable number of radial openings (not shown) which are equiangularly spaced apart from each other about the center of the hub. These openings are engaged by locking members one of which is designated by reference numeral 44 in FIG. 1. The locking member 44 is externally splined as at 46 to the synchronizing clutch sleeve 42 and is internally formed with a pocket or concavity 48. The pocket or concavity 48 is adapted to receive a detent spring 50 which urges the locking member 44 radially outwardly into engagement with the encircling synchronizing sleeve 42.

The first speed gear 20 has an axial boss 52 projecting toward the synchronizing clutch hub 36. A synchronizer clutch gear 54 having external teeth 56 is internally splined to the boss 52 of the first speed gear 20. The clutch gear 54 has a conical boss 58 which is tapered toward the clutch hub 36, viz., away from the first speed gear 20. A synchronizer baulk ring 60 has external teeth 62 which is configured in agreement with the teeth 56 of the clutch gear 54. The baulk ring 60 has an inner bore 64 which is conically shaped to match the conical outer peripheral surface of the boss 58 of the clutch gear 54. The external teeth 56 and 62 of the clutch gear 54 and the baulk ring 60, respectively, are so formed as to coincide with the internal gear teeth of the synchronizer clutch sleeve 42 and are located in line with the paths of the gear teeth of the clutch sleeve 42 which is axially movable to and from the baulk ring 58 and the clutch gear 54.

Designated by reference numeral 66 is a spacer element which is interposed between the mainshaft bearing 16 and the first speed gear 20 for holding the first speed gear 20 in position between the bearing 16 and the synchronizer clutch hub 36. Reference numeral 68 designates a reverse gear which is splined to the mainshaft 14 extending rearwardly from the rear end wall 12 of the transmission housing 10. The reverse gear 68 is adapted to mesh with a reverse idler gear (not shown) meshing, in turn, with a counter-reverse gear (not shown) which forms part of the countergear 28. The mainshaft 14 is enclosed within a rear extension 70 of the transmission housing 10 and is drivingly connected to a propeller shaft (not shown) of the driveline as usual.

The transmission mechanism above described further includes gears for effecting shifts to second and third speeds or even higher speeds but, since the present invention is directed solely to the synchronizing device associated with the first speed gear arrangement, description of such gears will now be herein incorporated.

In operation, the rotational power carrier over to the transmission input shaft (not shown) is transferred through the countergear assembly 28 to the first speed gear 20 constantly meshing with the first speed counter gear 26 of the countergear assembly. If, under these condition, the synchronizing device 34 is in a neutral position disengaged from the first speed gear 20 as illustrated in FIG. 1, no rotational power is transmitted to the mainshaft 14 because the first speed gear 20 is carried on the mainshaft extension 18 through the bearing 24 and is thus free to rotate on the mainshaft extension 18. If, then, the gearshift lever (not shown) is manipulated to select the first speed from the neutral position, the synchronizer clutch sleeve 42 is moved rightwardly of the drawing, viz., toward the first speed gear 20 so that the locking members 44 forced against the clutch sleeve 42 by the detent springs 50 are urged in the same direction. The locking members 44 thus forces the synchronizer baulk ring 60 rightwardly of the drawings, viz., toward the synchronizer clutch gear 54 and, as a consequence, the baulk ring 60 slides on the conical outer peripheral surface 64 of the clutch gear 54 rotating with the first speed gear 20, thereby increasing the frictional torque tending to produce synchronization between the first speed gear 20 and the synchronizer clutch hub 42.

When synchronism is attained between the first speed gear 20 and the synchronizer clutch hub 42, the frictional drag between the baulk ring 60 and the clutch gear 54 is reduced to zero. When, under these conditions, the clutch sleeve 42 is further moved by the shifter fork (not shown) toward the first speed gear 20, the internal teeth of the sleeve 42 will mesh with the gear teeth 62 of the baulk ring 60 and further with the gear teeth 56 of the clutch gear 54, whereby a driving connection is completed from the first speed gear 20 to the synchronizer hub 36 so that the rotational power is transmitted from the countergear assembly 28 to the transmission mainshaft 14.

In order to achieve an increased synchronizing efficiency during shifting to the first speed from the neutral position in the synchronizing mechanism above described, a most usual expedient would be to enlarge the overall diameter of the synchronizer baulk ring 60. Located in conjunction with the countergear assembly 28, the baulk ring 60 will be interfered with by the countergear assembly 28 if the baulk ring 60 is enlarged excessively. There thus exists a limit to the size of the baulk ring and it is extremely difficult to significantly increase the synchronizing efficiency in shifting to the first speed by resorting to the modification of the baulk ring, as previously pointed out.

Figure 2:
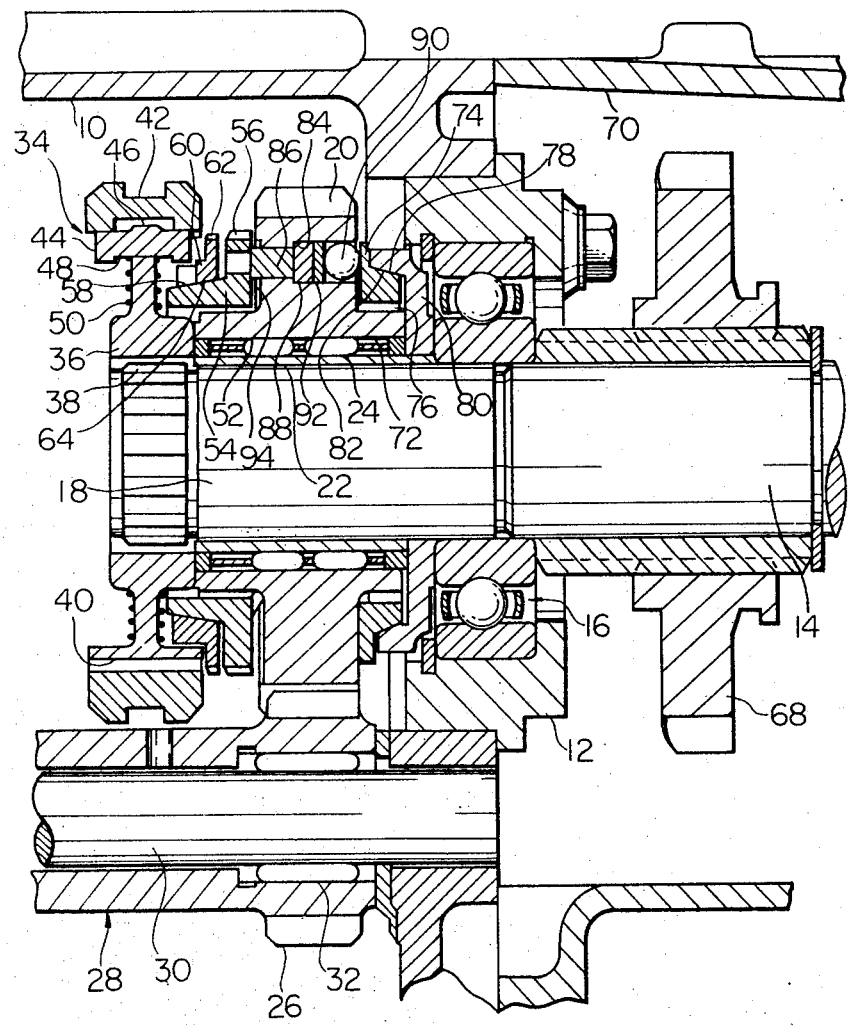
FIG. 2 is a view similar to FIG. 1 but now illustrates a preferred embodiment of the synchronizing device according to the present invention.

FIG. 2 illustrates the first speed gear arrangement including a preferred embodiment of the synchronizing mechanism according to the present invention adapted to provide, without resort to using an enlarged synchronizer baulk ring, a considerably increased synchronizing efficiency during shifting to the first speed from the neutral. In FIG. 2, the parts and elements corresponding to those incorporated in the arrangement illustrated in FIG. 1 are all designated by like reference numerals.

Referring to FIG. 2, an appropriate amount of space is provided around the extension 18 of the mainshaft 14 between the mainshaft retainer bearing 16 and the first speed gear 20. This may be achieved by removing from the arrangement of FIG. 1 the ring-shaped spacer element 66 provided between the retainer bearing 16 and the first speed gear 20 and, preferably, positioning the retaining bearing 16 and accordingly the rear end wall 12 of the transmission housing 10 at an increased distance from the first speed gear 20. The first speed gear 20 has an axial boss portion 72 extensing rearwardly into the space thus formed between the mainshaft retainer bearing 16 and the first speed gear 20 and rotatable with the gear 20 on the mainshaft extension 18. A clutch ring 74 is splined as at 76 to this boss portion 72 of the first speed gear 20 and is thus rotatable with the first speed gear. The clutch ring 74 has an outer peripheral surface 78 which is tapered rearwardly and receives thereon a second baulk ring 80 having an inner conical surface 82 matching the conical surface 78 of the clutch ring 74. The baulk ring 80 is secured at its inner perimeter to the mainshaft extension 18 and is thus rotatable with the mainshaft extension.

The first speed gear 20 is formed with a suitable number of stepped holes 84 extending throughout its thickness in parallel to an axis thereof. Each of the holes 84 receives therein a plunger 86 projecting out of the hole 84 toward the synchronizer clutch gear 54, a stop member 88 engaging at one end with the inner end of the plunger 86, and a rigid ball member 90 engaging at its outer top with the side face of the clutch ring 74. Designated by reference numeral 92 is a ball seat member which may be interposed between the stop member 88 and the ball member 90. The assembly of the plunger 86, stop member 88, ball member 90 and ball seat member 92 is movable through the hole 84 between the clutch gear 54 and the clutch ring 74, the movement of the ball member 90 being limited by means of the stop member 88 which is engageable at its end adjacent the plunger 86 with an inwardly stepped wall defining the hole 84. The assembly thus serves to transmit the thrust from the clutch gear 54 to the clutch ring 74 when the clutch gear 54 is depressed by the first baulk ring 60 toward the first speed gear 20.

An initially coned disc spring (Belleville spring) 94 is interposed between the clutch gear 54 and first speed gear 20. The spring 94 acts to bias the clutch gear 54 away from the first speed gear 20 which is held stationary in the axial direction, thereby serving to prevent frictional engagement between the clutch ring 74 and the ball member 90 when synchronism is attained between the first speed gear 20 and the mainshaft extension 18 as will be described in more detail.

When, in operation, the first speed gear 20 is driven to rotate on the mainshaft extension 18 so as to drive, in turn, the synchronizer clutch gear 54 which is splined to the gear 20, no torque delivery occurs from the first speed gear 20 to the mainshaft 14 is the synchronizer clutch sleeve 42 is in the neutral position, as previously mentioned.

If, now, the clutch sleeve 42 is moved by the shifter fork (not shown) rightwardly of the drawing, viz., towards the first speed gear 20, then the locking members 44 are also moved toward the first speed gear 20 from its neutral position illustrated, thereby forcing the first synchronizer baulk ring 60 against the clutch gear 54. The baulk ring 60 consequently is forced to slide on the conical surface 64 of the clutch gear 54, increasing the frictional torque tending to produce synchronization between the first speed gear 20 and the synchronizer clutch hub 42 as is usual in the prior art synchronizing mechanisms.

While the synchronism is being reached between the first speed gear 20 and the synchronizer clutch hub 36 in this manner, the synchronizer clutch gear 54 which is being depressed against the action of the disc spring 94 toward the first speed gear 20 by means of the first baulk ring 60 urges the plungers 86 in the holes 84 in the first speed gear 20 rearwardly, viz., away from the synchronizer clutch hub 36 so that the ball members 90 are forced through the stop members 88 and ball seat members 92 against the front face of the synchronizer clutch ring 74 which is splined to the rear boss 72 of the first speed gear 20. The clutch ring 74 is consequently forced away from the first speed gear 20 into frictional engagement with the second synchronizer baulk ring 80 through the matching conical surfaces 78 and 82 of the two elements. The second baulk ring 80 is fixed to the mainshaft extension 18 and is, therefore, the frictional drag between the conical surfaces 78 and 82 of the clutch ring 74 and the baulk ring 80, respectively, is reduced to zero when the baulk ring 80 is completely synchronized with the clutch ring 74, at which instant the first synchronizing baulk ring 60 rotating with the synchronizing clutch hub 36 is fully synchronized with the clutch gear 54.

The synchronism between the first speed gear 20 and the mainshaft extension 18 is thus attained by means of actions of the members located on both sides of the first speed gear 20 with the result that the synchronizing force and accordingly the synchronizing efficiency are increased to a remarkable extent.

When the synchronizer clutch sleeve 42 is further moved by the shifter fork (not shown) toward the first speed gear 20 after complete synchronism has been thus attained between the first speed gear 20 and the mainshaft extension 18, the inner gear teeth formed on the clutch sleeve are brought into mesh with the external teeth 56 of the clutch gear 54 so that a driving connection is completed from the first speed gear 20 to the synchronizer clutch hub 36 through the clutch gear 54. When the coupling between the clutch hub 36 and the first speed gear 20 is thus complete, the clutch gear 54 is forced to slide on the front boss portion 52 of the first speed gear 20 toward the synchronizer clutch hub 36 by the action of the disc spring 94 so that the assembly of the plunger 86, the stop member 88 and the ball member 90 in each of the holes 84 in the first speed gear 20 is released from the thrust from the clutch gear 54, allowing the clutch ring 74 to be disengaged from the second synchronizer baulk ring 80. The plunger 86 is consequently moved back toward the clutch gear 54 to a position which is dictated by the stop member 88 abutting to the inwardly stepped wall defining the hole 84 in the first speed gear.

From the above description it will be apparently understood that through use of the synchronizing device according to the present invention the synchronizing force and accordingly the synchronizing efficiency can be remarkably increased during shifting to the first speed. The increased synchronizing force will, furthermore, lend itself to avoiding improper uncoupling or failure of uncoupling of the synchronizing device from the first speed gear as would otherwise be invited by reason of the dragging torque between the frictionally engaging members of the synchronizing device. Since, moreover, synchronism can be attained with a minimum of manipulative force and in a shortened period of time, a driver of the motor vehicle will be given a feeling of assuredness and swiftness during shifting to the first speed. The improvement according to the present invention can be readily incorporated in the transmission mechanisms of the usual constructions through minor modifications made therein and with use of parts which are commonly in use so that the merits offered by the improvement may be exploited at low cost.

The embodiment of the present invention thus far described is merely for the purpose of illustration and is, therefore, subject to modification and change where desired. FIG. 3 illustrates an example of such modifications.

Referring to FIG. 3, the mechanism to transmit the thrust of the synchronizer clutch gear 54 to the clutch ring 74 now consists of at least one combination of a plunger 96 and an abutment member 98 which are axially slidably received in a stepped hole 100 formed in the first speed gear 20. The plunger 96 project at one end out of the hole 100 toward the clutch gear 54 and engages at the other end with the abutment member 98. The abutment member 98, on the other hand, is engageable at its rear end with the clutch ring 74 splined to the rear boss portion 72 of the first speed gear 20. The abutment member 98 also serves as a stop member which is engageable at its inner end with an inwardly stepped wall defining the hole 100. When the synchronizer clutch gear 54 is forced toward the first speed gear 20 against the action of the initially coned disc spring 94, the assembly of the plunger 96 and the abutment member 98 is moved through the hole 100 until the abutment member 98 is brought into abutment with the front face of the clutch ring 74. The clutch ring 74 is consequently forced against the second baulk ring 80 similarly to the arrangement shown in FIG. 2. The assembly of the plunger 96 and the abutment member 98 is returned to the initial position by the action of the disc spring 94 when the coupling between the first speed gear 20 and the synchronizer clutch hub 36 is complete.

FIG. 4 illustrates a relation between the mating teeth of the synchronizer clutch sleeve 42 and the synchronizer clutch gear 54 under the conditions in which synchronism has been completely established between the first speed gear and the synchronizer clutch hub (FIG. 2). As seen in FIG. 4, the teeth of the clutch sleeve 42 and the clutch gear 54 have V-shaped ends formed by inclined faces 42a and 54a, respectively, and when the teeth of the two members incipiently mate with each other, one face 42a of the tooth of the clutch sleeve 42 is in contact with one face 54a of the tooth of the clutch gear 54. It is, thus, apparent that in order to provide such a relation between the teeth of the clutch sleeve 42 and the clutch gear 54, the clutch gear 54 and accordingly the first speed gear splined thereto should be circumferentially in advance of the clutch sleeve 42 by one half of the pitch of the teeth of the clutch sleeve 42 as indicated by D in FIG. 4. For the purpose achieving such motions of the clutch sleeve 42 and the clutch gear 54, it is necessary that a driving force be imparted to the clutch sleeve 42 in the axial direction of the sleeve as indicated by an arrow P. Designated by $\alpha$ is an angle formed by the end faces 42a of each tooth of the synchronizer clutch sleeve 42.

Reference is further made to FIG. 5 with this in mind. In FIG. 5, curve $a$ indicates a manipulative force required to move the gearshift lever for moving the synchronizer clutch sleeve until the synchronism is perfectly achieved between the first speed gear and the transmission mainshaft and the synchronizer clutch sleeve is completely coupled to the synchronizer clutch gear. The axis of abiscissa thus represents the time which has lapsed after the clutch sleeve has incipiently been moved to effect shifting to the first speed, wherein time $t_1$ is the time at which complete synchronism is attained and time $t_2$ is the time at which the coupling between the synchronizer clutch sleeve and gear is complete. Time $t_3$, moreover, is the time at which a reaction which is transmitted to the gearshift lever when the coupling between the synchronizer clutch sleeve and gear is complete but which is not sensed by the operator manipulating the gearshift lever. $P_1$, $P_2$ and $P_3$ thus indicate manipulative forces imposed on the operator at the times $t_1$, $t_2$ and $t_3$, respectively, during the shifting operation.

The embodiments of the synchronizing device thus far described are intended to reduce the manipulative force $P_1$ and the time $t_1$. As previously noted, the present invention further contemplates reduction of the manipulative force $P_2$ which is required at time $t_2$ when the gearshift lever is to be moved to bring the synchronizer clutch sleeve into engagement with the synchronizer clutch gear. An embodiment of the synchronizing device adapted to achieve this end is illustrated in FIGS. 6a and 6b.

As is apparent from the discussion given in connection with FIG. 4, this particular purpose will be achieved in an arrangement in which the synchronizer clutch sleeve is in advance of the synchronizer clutch gear and accordingly the first speed gear by one half of the pitch of the gear teeth of the clutch sleeve. To exploit the features of the embodiments of the synchronizing device according to the present invention as thus far described, the embodiment illustrated in FIGS. 6a and 6b is provided with an arrangement by which the transmission mainshaft and the second baulk ring located rearwardly of the first speed gear are circumferentially movable relative to each other by a distance corresponding to one half of the pitch of the teeth of the synchronizer clutch sleeve to mesh with the synchronizer clutch gear.

Referring to FIGS. 6a and 6b of the drawings, the second synchronizer baulk ring 80 is connected to the extension 18 of the transmission mainshaft through a rigid ball 102 which is received in grooves 104 and 106 formed in the inner and outer peripheral walls of the baulk ring 80 and the mainshaft extension 18, respectively. As will be better seen in FIG. 6b, the grooves 104 and 106 are elongated circumferentially of the inner and outer peripheral walls of the baulk ring 80 and the mainshaft extension 18 to a length which is appreciably larger than the length D equal to one half of the pitch of the internal teeth of the synchronizer clutch sleeve 42 (FIG. 2). The baulk ring 80 and the mainshaft extension 18 connected together in this manner are thus circumferentially movable relative to each other over the distance D.

Figure 7B:
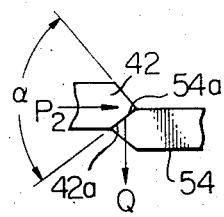
FIG. 7b is a scrap plan view of the relation between the teeth of the members forming the synchronizing device shown in FIGS. 6a and 6b as achieved when the relation shown in FIG. 7a is established.

When, more specifically, shifting is to be effected up to the first speed, the first speed gear 20 is rotating at a speed higher than the speed of rotation of the mainshaft extension 18 so that the baulk ring 80 will be circumferentially in advance of the mainshaft extension 18 by the distance D as indicated in FIG. 7a. If, thus, the synchronizer clutch sleeve is moved by the gearshift lever so as to move the synchronizer clutch gear 54 by the manipulative force $P_2$ in the direction of arrow in FIG. 7b toward the first speed gear, then a lateral or circumferential component of force of Q will be exerted on the end face 54a of each tooth of the synchronizer clutch gear 54 to mate with the end face 42a of the tooth of the synchronizer clutch sleeve 42 as indicated in FIG. 7b. Since, in this instance, the second synchronizer baulk ring 80 and the mainshaft extension 18 are formed with the grooves 104 and 106, respectively, permitting the baulk ring 80 and the mainshaft extension 18 to move circumferentially relative to each other, the baulk ring 80 is urged to revolve on the mainshaft extension 18 in the direction of arrow Q in FIG. 7b whereupon the first speed gear 20 and accordingly the synchronizer clutch gear 54 (FIG. 2) are circumferentially moved in the same direction as the baulk ring 80, thereby permitting the synchronizer clutch sleeve 42 to axially move toward the first spaced gear 20 into mesh with the synchronizer clutch gear 54.

Figure 8A:
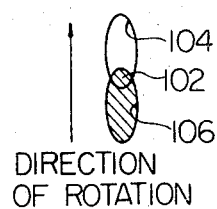
FIG. 8a and 8b are views showing the relations similar to those illustrated in FIGS. 7a and 7b but achieved when shifting is effected down to the first speed.
Figure 8B:
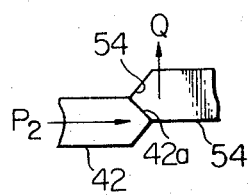

FIGS. 8a and 8b indicate the relations between the second baulk ring 80 and the mainshaft extension 18 and between the teeth of the synchronizer clutch sleeve 42 and the synchronizer clutch gear 54 as brought about when shifting is to be effected down to the first speed with the transmission mainshaft 18 rotating at a speed lower than the speed of rotation of the first speed gear 20.

Figure 9:
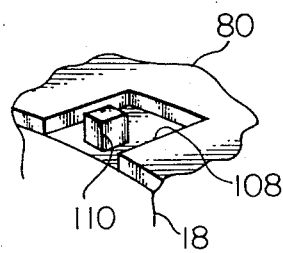
FIG. 9 is a fragmentary perspective view showing essential parts forming still another preferred embodiment of the synchronizing device according to the present invention.
Figure 10A:
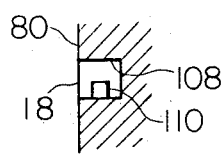
FIGS. 10a and 10b are scrap plan views showing the relations between the parts illustrated in FIG. 9 as achieved when shifting is effected up and down to the first speed, respectively.
Figure 10B:
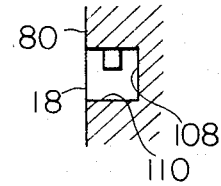

FIG. 9 illustrates a modification of the arrangement illustrated in FIGS. 6a and 6b. As seen in FIG. 9, the second synchronizer clutch gear 80 has formed in its inner peripheral wall a recess 108 facing the outer peripheral surface of the mainshaft extension 18 while the mainshaft extension 18 has formed on its outer peripheral surface a projection 110 projecting into the recess 108 in the baulk ring 80. It is, in this instance, important that the recess 108 and the projection 110 be so sized that the recess 108 is capable of accommodating the circumferential movement of the projection 110 by a distance which is substantially equal to one half of the pitch of the internal gear teeth of the synchronizer clutch sleeve 42. When, thus, the synchronizer clutch sleeve is moved so as to effect shifting up to the first speed, then the synchronizer baulk ring 80 will be circumferentially in advance of the mainshaft extension 18 with the projection 110 abutting to the training edge of the recess 108 and spaced apart from the leading edge of the recess by the distance substantially equal to one half of the pitch of the teeth of the synchronizer clutch sleeve, as will be seen in FIGS. 10a. FIG. 10b illustrates the relation between the recess 108 and the projection 110 attained when shifting is effected down to the first speed so that the projection 110 is in abutting engagement with the leading edge of the recess 108.

It will now be appreciated from the foregoing description that the embodiment illustrated in FIGS. 6a and 6b or in FIG. 9 is useful in reducing the manipulative force imposed on the operator when moving the gearshift lever to couple the synchronizer clutch sleeve to the first speed gear.

It may be added that the experiments conducted by the inventors have revealed that the synchronizing power can be approximately doubled where the teeth of the synchronizing clutch sleeve and gear are chamfered to produce an angle $\alpha$ which is equal to those which are commonly in use.

What is claimed is:

1. A synchronizing device particularly for a manually operated power transmission mechanism including a transmission mainshaft and a first speed gear rotatable on the mainshaft, which device comprises a synchronizer clutch hub rotatable with said mainshaft, a synchronizer clutch sleeve rotatable with and axially slidable on said synchronizer clutch hub, said synchronizer clutch sleeve having internal gear teeth and adapted to be axially moved from the outside of the synchronizing device, at least one locking member rotatable with and axially slidable on an inner peripheral wall of said synchronizer clutch sleeve, a synchronizer clutch gear located between said synchronizer clutch hub and said first speed gear and rotatable with and axially slidable on the first speed gear, said synchronizer clutch gear having a conical portion tapered toward said synchronizer clutch hub, a first baulk ring located between said locking member and said synchronizer clutch gear and having an inner conical surface matching said conical portion of said synchronizer clutch gear, said synchronizer clutch gear and said first baulk ring having external gear teeth which are in agreement with and located in line with said internal gear teeth of said synchronizer clutch sleeve, a synchronizer clutch ring located opposite to said synchronizer clutch gear across said first speed gear and rotatable with and axially slidable on the first speed gear, said synchronizer clutch ring having a conical portion which is tapered away from the first speed gear, a second baulk ring rotatable with the transmission mainshaft and having an inner conical surface matching said conical portion of said synchronizer clutch ring, thrust transfer means engageable at one end with said synchronizer clutch gear and at the other end with said synchronizer clutch ring across the first speed gear so that an axial pressure from the synchronizer clutch gear is transmitted to the synchronizer clutch ring when the synchronizer clutch gear is forced toward the ring speed gear, and resilient biasing means for urging said synchronizer clutch gear away from the first speed gear on the mainshaft.

2. A synchronizing device as claimed in claim 1, in which said second baulk ring and said transmission mainshaft are circumferentially movable relative to each other by a distance substantially equal to one half of the pitch of said internal gear teeth of said synchronizer clutch sleeve.

3. A synchronizing device as claimed in claim 1, in which said thrust transfer means is axially movably received in a hole formed in said first speed gear throughout its thickness, said thrust transfer means comprising a plunger axially projecting toward said synchronizer clutch gear for being engaged by the clutch gear when the clutch gear is forced toward the first speed gear, a rigid ball member located at an end of said hole opposite to said plunger for engagement with said synchronizer ring when forced toward the synchronizer ring, and a stop member located between said plunger and said ball member for transmitting the pressure from the plunger to the ball member and limiting the movement of the plunger and the ball member toward the synchronizer clutch gear when the clutch gear is urged away from the first speed gear by the action of said resilient biasing means.

4. A synchronizing device as claimed in claim 1, in which said thrust transfer means is axially movably received in a hole formed in said first speed gear throughout its thickness, the transfer means comprising a plunger axially projecting out of said hole toward said synchronizer clutch gear for being engaged by the clutch gear when the clutch gear is forced toward the first speed gear and an abutment member located at an end of said hole and engageable at one end with said plunger and at the other end with said synchronizer ring, said abutment member being operative to limit the movement of said plunger toward said synchronizer clutch gear when the clutch gear is forced away from the first speed gear by the action of said resilient biasing means.

5. A synchronizing device as claimed in claim 1, in which said resilient biasing means comprises an initially coned disc spring which is interposed between said synchronizer clutch gear and said first speed gear.

6. A synchronizing device as claimed in claim 1, in which said second baulk ring has formed in its inner peripheral wall a groove facing an outer peripheral surface of the transmission mainshaft and said mainshaft is formed with a groove which is in line with said groove in the second baulk ring circumferentially of the mainshaft, said grooves in the second baulk ring and the mainshaft being elongated circumferentially of the baulk ring and mainshaft to a length which is substantially equal to one half of the pitch of said internal gear teeth of said synchronizer clutch sleeve, wherein said second baulk ring is fitted on said transmission mainshaft through a ball received in said grooves so that the second baulk ring and said mainshaft is circumferentially movable relative to each other by a distance equal to said length.

7. A synchronizing device as claimed in claim 1, in which said second baulk ring has formed in its inner peripheral wall a recess facing an outer peripheral surface of the transmission mainshaft and in which said transmission mainshaft has formed on its outer peripheral surface a projection projecting into said recess, wherein said recess and said projection are so sized as to permit the recess and projection to move relative to each other circumferentially of the second baulk ring and the mainshaft by a distance substantially equal to one half of the pitch of the internal gear teeth of said synchronizer clutch sleeve.

8. A synchronizing device as claimed in claim 3, in which said second baulk ring has formed in its inner peripheral wall a groove facing an outer peripheral surface of the transmission mainshaft and said mainshaft is formed with a groove which is in line with said groove in the second baulk ring circumferentially of the mainshaft, said grooves in the second baulk ring and the mainshaft being elongated circumferentially of the baulk ring and mainshaft to a length which is substantially equal to one half of the pitch of said internal gear teeth of said synchronizer clutch sleeve, wherein said second baulk ring is fitted on said transmission mainshaft through a ball received in said grooves so that the second baulk ring and said mainshaft is circumferentially movable relative to each other by a distance equal to said length.

9. A synchronizing device as claimed in claim 4, in which said second baulk ring has formed in its inner peripheral wall a groove facing an outer peripheral surface of the transmission mainshaft and said mainshaft is formed with a groove which is in line with said groove in the second baulk ring circumferentially of the mainshaft, said grooves in the second baulk ring and the mainshaft being elongated circumferentially of the baulk ring and mainshaft to a length which is substantially equal to one half of the pitch of said internal gear teeth of said synchronizer clutch sleeve, wherein said second baulk ring is fitted on said trnasmission mainshaft through a ball received in said grooves so that the second baulk ring and said mainshaft are circumferentially movable relative to each other by a distance equal to said length.

10. A synchronizing device as claimed in claim 3, in which said second baulk ring has formed in its inner peripheral wall a recess facing an outer peripheral surface of the transmission mainshaft and in which said transmission mainshaft has formed on its outer peripheral surface a projection projecting into said recess, wherein said recess and said projection are so sized as to permit the recess and projection to move relative to each other circumferentially of the second baulk ring and the mainshaft by a distance substantially equal to one half of the pitch of the internal gear teeth of said synchronizer clutch sleeve.

11. A synchronizing device as claimed in claim 4, in which said second baulk ring has formed in its inner peripheral wall a recess facing an outer peripheral surface of the transmission mainshaft and in which said trnasmission mainshaft has formed on its outer peripheral surface a projection projecting into said recess, wherein said recess and said projection are so sized as to permit the recess and projection to move relative to each other circumferentially of the second baulk ring and the mainshaft by a distance substantially equal to one half of the pitch of the internal gear teeth of said synchronizer clutch sleeve.

* * * * *